United States Patent [19]

Melnick

[11] 4,261,212

[45] Apr. 14, 1981

[54] UNIDIRECTIONAL FORCE GENERATOR

[76] Inventor: Harry S. Melnick, 160 Steele Rd., West Hartford, Conn. 06119

[21] Appl. No.: 35,428

[22] Filed: May 2, 1979

[51] Int. Cl.³ .............................................. F16H 27/04
[52] U.S. Cl. ...................................................... 74/84 R
[58] Field of Search .......................... 74/61, 84 R, 84 S

[56] References Cited

U.S. PATENT DOCUMENTS

| | | | |
|---|---|---|---|
| 2,350,248 | 5/1944 | Nowlin | 74/61 |
| 2,743,585 | 5/1956 | Berthet et al. | 74/61 |
| 2,886,976 | 5/1959 | Dean | 74/112 |
| 2,958,227 | 11/1960 | Peterson | 74/61 |
| 3,404,854 | 10/1968 | Di Bella | 74/84 X |
| 3,555,915 | 1/1971 | Young, Jr. | 74/84 |
| 3,653,269 | 4/1972 | Foster | 74/84 |
| 3,750,484 | 8/1973 | Benjamin | 74/84 |
| 3,810,394 | 5/1974 | Novak | 74/84 |
| 3,863,510 | 2/1975 | Benson | 74/64 |
| 3,897,692 | 8/1975 | Lehberger | 74/84 |
| 3,968,700 | 7/1976 | Cuff | 74/84 S |
| 4,095,460 | 6/1978 | Cuff | 74/84 S |

FOREIGN PATENT DOCUMENTS

213927  6/1956  Australia ........................................ 74/61

*Primary Examiner*—Allan D. Herrmann
*Attorney, Agent, or Firm*—McCormick, Paulding & Huber

[57] ABSTRACT

Disclosed is a device for producing a unidirectional force which may be used to propel a vehicle or other body in one direction or to serve in other applications requiring such a force. The device uses a centrifugal force generator which repetitively provides alternately occurring prolonged centrifugal forces of opposite direction along a line fixed relative to the generator. As these forces are produced the generator is turned relative to a supporting carriage so that each time such a force occurs it has a generally forward direction relative to the carriage. Two or more centrifugal force generators may be mounted on a single carriage and operated in synchronism and in proper phase relationship to one another to produce a forwardly directed force of relatively steady magnitude and/or to cancel force components directed perpendicular to the forward direction.

18 Claims, 3 Drawing Figures

UNIDIRECTIONAL FORCE GENERATOR

BACKGROUND OF THE INVENTION

This invention relates to force generators, and deals more particularly with a device for mechanically producing a unidirectional force such as may be used to propel, brake or change the direction of a vehicle or other body.

A general object of this invention is to provide a device for producing a unidirectional force by purely mechanical means, more specifically a device wherein centrifugal force is generated and controlled to produce a highly useful force having one general direction.

Another object of the invention is to provide a device for a vehicle or body which, similar to a rocket engine, produces a unidirectional propulsion, braking or direction changing force acting directly on the associated vehicle or body with no reaction forces required between the vehicle and the earth, water or air through which it may be moving. That is, for example, when the device is mounted and operated on a wheeled land vehicle, the vehicle may be propelled forwardly or braked or changed in direction without any driving force being applied to any of the wheels.

A further object of this invention is to provide a unidirectional force generator which may be manufactured in many different sizes and shapes to suit any one of a wide range of applications to which it may be applied.

A still further object of the invention is to provide a unidirectional force generator of the foregoing character which is capable of providing a forwardly directed force of relatively steady magnitude and including no side-wise components.

Further objects and advantages of the invention will be apparent from the drawings and from the following detailed description of the preferred embodiments.

SUMMARY OF THE INVENTION

This invention resides in a mechanical device for producing a unidirectional force which may be used to propel, brake or change the direction of a vehicle or other body or to serve other applications requiring such a force. More particularly, the invention resides in a centrifugal force generator, which produces alternating prolonged centrifugal forces of opposite direction along a given line, combined with a means supporting the generator on a carriage and moving it in phase with the alternately created centrifugal forces so that as each of the centrifugal forces occurs it is headed in a generally forward direction and urges the carriage in the same sense. The prolonged centrifugal forces are produced by a generator comprising a frame, a weight means, and a means restraining the weight means to move along a path fixed to the frame and consisting of two substantially parallel segments joined by two substantially semicircular end segments, the weight means being distributed substantially uniformly along a continuous portion of the length of the path so that during each traverse of the path by the weight means a first centrifugal force is produced as the weight means passes over one of the two semicircular segments of the path and a second centrifugal force having a direction generally opposite to that of the first force is produced as the weight means moves over the other of the two semicircular path segments. The generator is mounted on the carriage for rotation about an axis fixed to the carriage and in a plane perpendicular to the parallel path segments, and a means is provided for simultaneously driving the frame about its axis relative to the carriage and the weight means along its path relative to the frame, the drive means being such that as the frame makes one complete revolution about its axis the weight means makes one complete traverse along its path. Therefore, each time the weight means moves over either one of its two semicircular path segments the centrifugal force produced has a component directed generally in the forward direction.

The invention also resides in providing the carriage with two or more centrifugal force generators which are so arranged and phased as to provide a more steady forwardly directed force than provided by a single generator and/or to cancel and eliminate side-wise directed components of the centrifugal forces.

DETAILED DESCRIPTION OF THE PREFERRED EMBODIMENT

Figure 1:
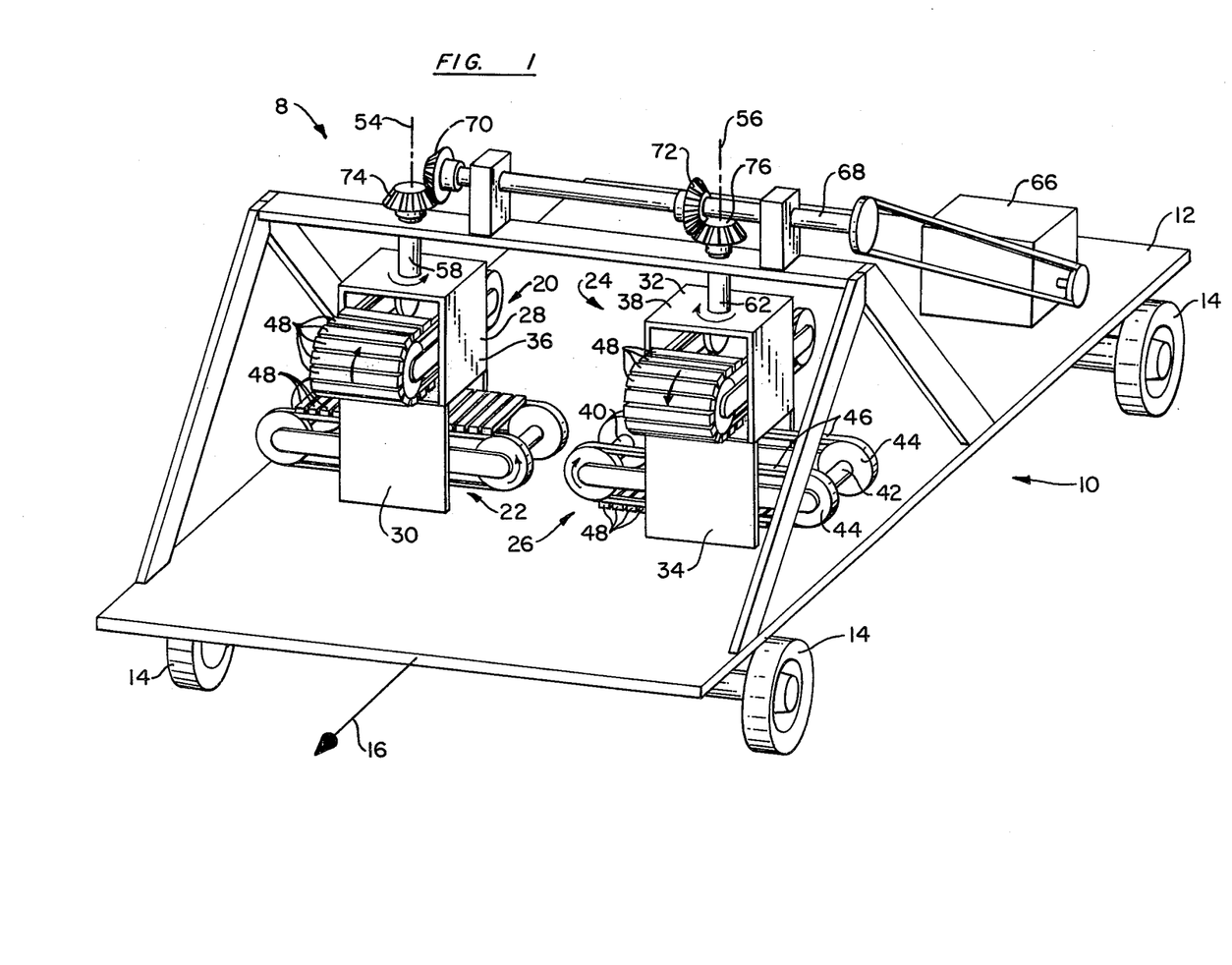
FIG. 1 is a schematic perspective view of a wheeled land vehicle having a force generating propulsion device embodying the present invention.
Figure 2:
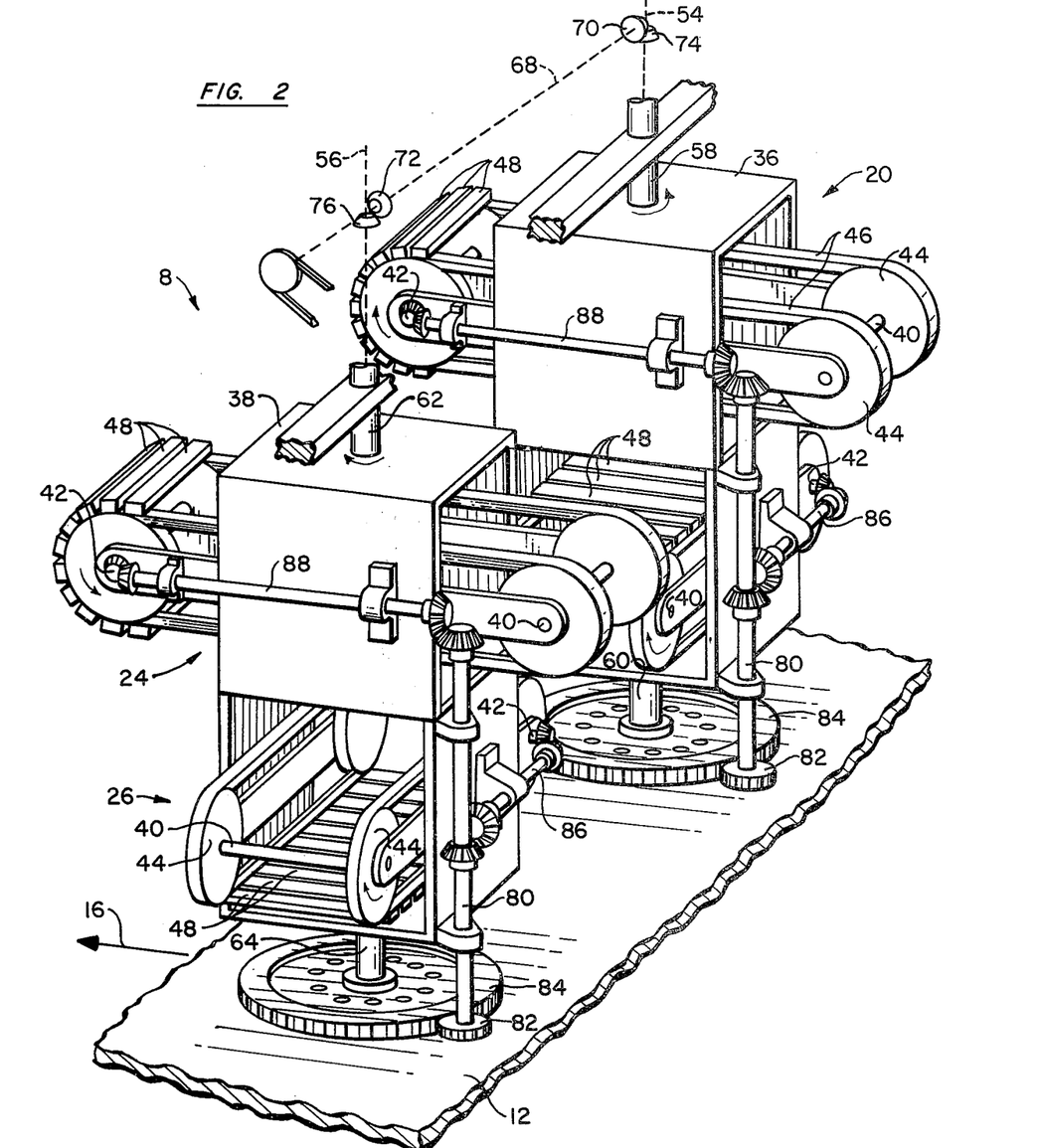
FIG. 2 is a perspective view showing in more detail the force generating device of FIG. 1.

Turning to the drawings and first considering FIGS. 1 and 2, these figures show a unidirectional force generating device 8 embodying this invention applied to the propulsion of a wheeled vehicle 10 consisting of a carriage or body 12 supported by a set of wheels 14, 14 for movement in a forward direction indicated by the arrow 16.

In its simplest form, a unidirectional force generating device embodying the invention utilizes a single basic centrifugal force generator, but preferably the device includes a number of such basic generators operated in synchronism and in such phase relationship to one another as to provide a relatively steady forwardly directed force and to cancel side-wise directed forces and perpendicular forces which occur as each set of weights enters and leaves each semicircular segment of its path. In keeping with this, the force generating device 8 of FIGS. 1 and 2 consists of four basic centrifugal force generators indicated respectively at 20, 22, 24 and 26. Each of the basic units or generators 20, 22, 24 and 26 has a frame 28, 30, 32 and 34, respectively, which is supported for rotation relative to the carriage 12. The two frames 28 and 30 are fixed to one another and are part of a common frame 36 and likewise the two frames 32 and 34 are fixed to one another and form part of another common frame 38.

Each generator 20, 22, 24 and 26 has an associated weight means and a means for restraining such weight means to movement along a path fixed to the associated frame 36 and 38 and consisting of two parallel segments joined by two semicircular end segments. The path restraining means may take various different forms, but in the illustrated case each such means comprises two parallel shafts 40 and 42 each carrying two spaced wheels or sprockets 44, 44 to movably support two endless flexible members 46, 46 such as chains or belts. The weight means of each generator extends along a portion of the length of its path of movement and consists of a plurality of contiguous elongated weights 48, 48, such as metallic bars, extending between and attached to the two flexible members 46, 46. The flexible members 46, 46 when driven therefore serve to drive and restrain the weights 48, 48 to movement along the desired endless path consisting of two straight parallel segments, defined by the distance between the two shafts 40 and 42 and the two semicircular end segments defined by the curvature of the circular members 44, 44.

Figure 3:
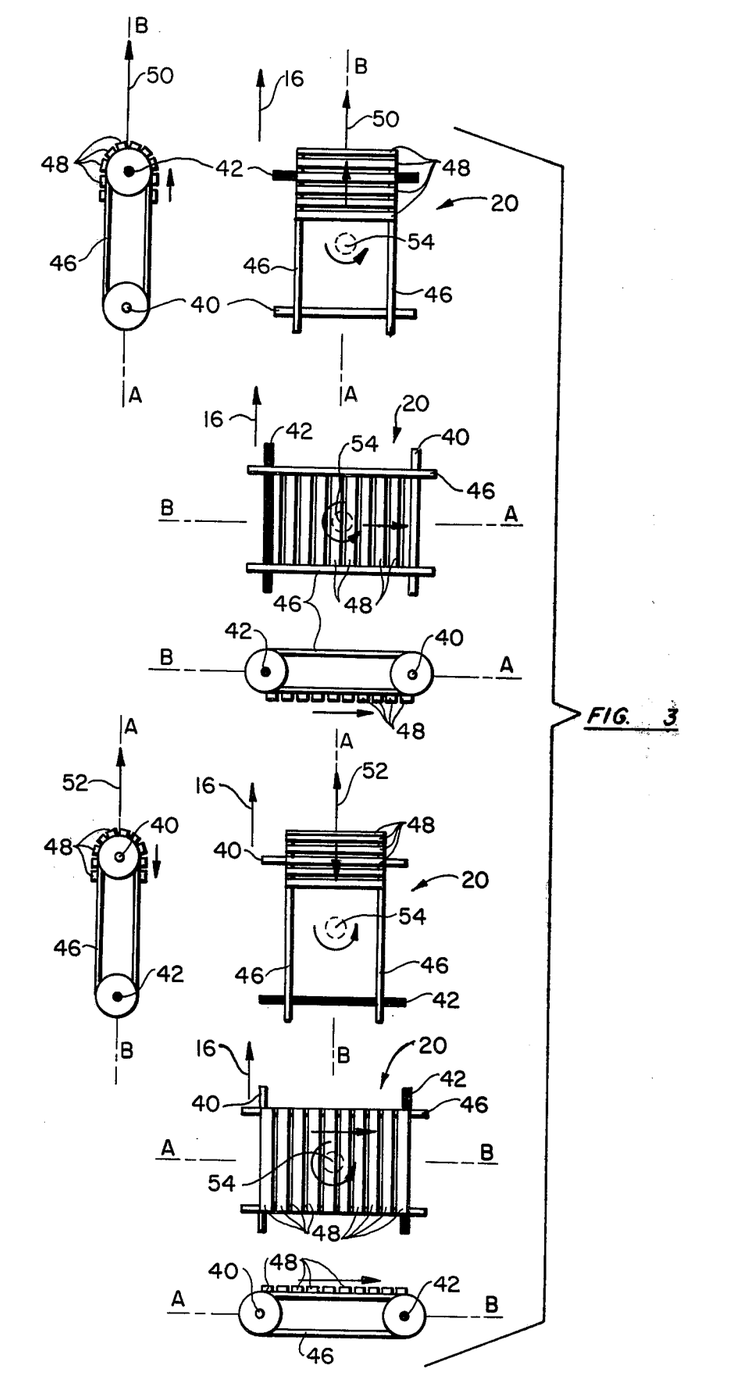
FIG. 3 is a set of views showing one of the centrifugal force generators of FIG. 1 as such generator undergoes one cycle of its operation.

The weights 48, 48 of each generator 20, 22, 24 or 26, occupy a substantial portion of the length of the associated endless path along which they move. This path is preferably less than one-half of the total length of the path and greater than the length of each semicircular path end segment, as shown in FIG. 3. Therefore, as will be evident from the figures, especially FIG. 3, when the weights 48, 48 of each generator are driven along their endless path, they first pass over one semicircular path end portion, without other weights at the same time moving over the other semicircular path end portion, and therefore create a first centrifugal force, such as indicated at 50 in FIG. 3, directed generally along the line AB joining the two centers of the semicircular end segments. Thereafter, the weights pass over the other semicircular path end portion and produce a second centrifugal force, indicated at 52 in FIG. 3 directed in the opposite direction along the line AB.

Since the weights 48, 48 of each generator are distributed over a substantial length of their path of movement it requires a substantial time for these weights to pass over each of its semicircular path end segments and, therefore, the centrifugal force 50 or 52 which is generated by such movement persists for a substantial duration time.

The two frames 36 and 38 are supported for rotation relative to the carriage 12 about axes 54 and 56, respectively, fixed relative to the carriage. More particularly, as shown in FIG. 2, the frame 36 is fixed to two aligned shafts 58 and 60 rotatably supported by the carriage for rotation about the axis 54. Likewise, the frame 38 is fixed to two aligned shafts 62 and 64 rotatably supported by the carriage for movement about the axis 56. The two axes 54 and 56 are both vertical and located in a plane perpendicular to the forward direction 16 of the carriage, and the centrifugal force generators 20, 22, 24 and 26 are so located on their frames 36 and 38 that the parallel segments of the endless paths traversed by the weight means are horizontal, thereby causing the axes 54 and 56 to be located in planes perpendicular to the parallel segments of the associated weight paths.

In accordance with the invention, a means is provided for rotating the two shafts 58 and 62 to simultaneously rotate the frames 36 and 38 in opposite directions about the axes 54 and 56 and for at the same time driving the weights 48, 48 of the four centrifugal force generators 20, 22, 24 and 26. As shown in FIGS. 1 and 2 this drive means comprises a power source 66, such as a gasoline engine, an electric motor, etc., mounted on the carriage 12 and driving a shaft 68. The shaft 68 in turn has fixed thereto two bevel gears 70 and 72 which mesh with corresponding bevel gears 74 and 76 fixed respectively to the shafts 58 and 62, thereby causing the shafts 58 and 62 to be rotated at the same speed but in opposite directions. The two generators 20 and 24 are mounted on the two frames 36 and 38 in such phase relationship to one another that when one of these generators has the parallel segments of its endless path, that is the straight segments of its flexible members 46, 46, parallel to the forward direction 16 the parallel segments of the endless path of the other generator are also parallel to the forward direction, as is the case for the instant shown in FIGS. 1 and 2. Also, the other two generators 22 and 26 are so arranged on the frames 36 and 38 that the straight segments of their endless paths will also be jointly parallel to the forward direction 16 at the same moment of time. However, the generators 22 and 26 have the straight segments of their paths arranged at an angle about the axes 54 and 56 relative to the straight path segments of the generators 20 and 24. In the illustrated case, this angle is 90 degrees so that after the two frames 36 and 38 rotate 90 degrees from the position illustrated in FIG. 2 the two generators 22 and 26 will have their straight path segments aligned with the forward direction 16.

For driving the weights 48, 48 of its two generators 20 and 22 the frame 36, as shown in FIG. 2, carries a shaft 80 having a gear 82 which meshes with a gear 84 fixed to the carriage 12 so that as the frame 36 rotates about its axis 54 the shaft 80 is rotated relative to the frame. The shaft 80 drives two other shafts 86 and 88. The shaft 88 is drivingly connected to the shaft 42 of the generator 22 and the shaft 88 is similarly drivingly connected to the shaft 42 of the generator 20, the rotation of the two shafts 42, 42 of the two generators 20 and 22 accordingly causing movement of the associated weights 48, 48. The various gear ratios involved in the drive for the weights 48, 48 of the two generators 20 and 22 is such that for each complete revolution of the frame 36 about its axis 54 each weight 48 makes one complete traverse about its endless path. This is shown in more detail in FIG. 3 which by way of example shows the generator 20 at 90 degree increments of its movement about the axis 54.

Furthermore, the weights 48, 48 of each generator are so arranged that they pass over the forwardly facing one of its semicircular path end segments when the parallel or straight segments of its path are parallel to the forward direction 16. Therefore, as will be evident from FIG. 3, during a portion of the rotation of the generator 20 about its axis 54 the weights 48, 48 pass over the shaft 42 and produce the centrifugal force 50. This force persists for a substantial duration of time and, therefore, it is not at all times aligned with the forward direction 16, but while it exists it does at all times have a substantial component in such forward direction. Likewise, after the generator rotates 180 degrees from the top position of FIG. 3 the weights 48, 48 move over the shaft 40 and produce the centrifugal force 52 which also persists for a substantial amount of time. Due to the rotation of the generator the force 52 while it exists is not at all times aligned with the forward direction 16 but does have a substantial component in that direction. The operation of the weights 48, 48 for the generator 22, 24 and 26 are similar to that shown for the generator 20 in FIG. 3.

The generators 24 and 26 have a drive means for their weights 48, 48 similar to that for the generators 20 and 22 and the parts of this drive means have been given the same reference numbers as that for the generators 22 and 24 and need not be further described.

From the foregoing description of the unidirectional force generator of FIGS. 1, 2 and 3, it will be understood that as the frames 36 and 38 rotate about their axes 54 and 56 the two centrifugal force generators 20 and 24 each repetitively produce alternately appearing centrifugal forces of prolonged duration which are of opposite direction relative to the carriages 36 and 38. However, due to the rotation of the frames 36 and 38 each time one of these centrifugal forces appears it is directed generally in the forward direction 16. When the two generators 20 and 24 are instantaneously aligned with the forward direction 16 the centrifugal forces generated by these two generators will be directly in line with the forward direction 16 but at other times each such force will have both a forwardly directed component and a side-wise or laterally directed component. Because of the opposite directions of rotation of the two frames 36 and 38 these side-wise components of the two centrifugal forces produced by the two generators 20 and 24 will cancel one another so that the resultant of the two centrifugal forces is a purely forwardly directed force. Likewise, the two generators 22 and 26 operate in a similar manner to produce two centrifugal forces having forwardly directed components which add to one another and side-wise directed components which cancel one another. Also, the directions in which the respective weights of the generators 20 and 24 are moved are opposite to one another, as indicated by the arrows in FIGS. 1 and 2, so that as the two sets of weights enter and leave each semicircular segment of their paths the vertical components of their associated centrifugal forces are equal and opposite and, therefore, cancel one another. The same is also true for the generators 22 and 26.

Also, it will be understood that the forwardly directed resultant of the two centrifugal forces produced by the two generators 20 and 24 is of a varying magnitude which is a maximum when the two generators are facing forwardly and which is of a lesser value at other times. In the same manner the forwardly directed resultant of the two centrifugal forces produced by the two generators 24 and 26 is of a varying magnitude. But, the forwardly directed resultant produced by the two generators 24 and 26 is out of phase with the forwardly directed resultant produced by the two generators 20 and 24 and, therefore, the total forwardly directed force (that is, the sum of the two resultants) applied to the carriage is made more steady. In the illustrated device the forwardly directed resultant force produced by the two generators 20 and 24 is 90 degrees out of phase with the resultant forwardly directed resultant force produced by the two generators 22 and 26. Further improvements in the steadiness of the total forwardly directed force applied to the carriage 12 may be achieved by adding additional parts of centrifugal force generators to the device to produce three or more forwardly directed resultant forces separated from one another by phase angles less than 90 degrees.

In the drawings and description the unidirectional force generating device 8 has been shown and described for the purpose of producing a force used to propel the illustrated carriage 12 forwardly. However, it should be understood that it may also be used to brake the motion of a vehicle or body or to urge it in some other direction. In the illustrated case, for example, a reverse or braking force may be obtained by providing a change mechanism allowing the frames 36 and 38 to be turned 180 degrees without meshing of the gears 82 and 84 associated with each frame. Also, the entire device 8 may also be mounted on a table carried by the carriage 12 and rotatable relative to the carriage about a vertical axis, thereby allowing the generated unidirectional force to be directed in any direction relative to the carriage. For other types of vehicles or bodies, such as space craft, the device 8 could also be mounted on a table for universal movement relative to the vehicle or body to allow the generated force to be directed in any desired direction whatsoever.

I claim:

1. A device which converts centrifugal force into a unidirectional force applied to a carriage, characterized by, a frame; means supporting said frame on said carriage for rotation relative to said carriage about an axis fixed relative to said carriage; a weight means; means restraining said weight means to movement along a noncircular endless path fixed relative to said frame; said weight means being located along one portion of the length of said endless path and being absent from another substantial portion of said length of said endless path; first means for driving said frame about said axis relative to said carriage; and second means operable in synchronism with said first means for driving said weight means along said endless path relative to said frame.

2. A device as defined in claim 1 further characterized by said means restraining said weight means to movement along an endless noncircular path relative to said frame being at least two wheels supported by said frame for rotation relative to said frame about parallel axes fixed relative to said frame, and an endless flexible member trained over said at least two wheels and defining said endless path; and said weight means being at least one weight attached to said endless flexible member for movement therewith, said at least one weight of said weight means being located along one portion of the length of said endless flexible member and said endless flexible member being free from such weight means along another substantial portion of its length.

3. A device as defined in claim 1 or claim 2 further characterized by, a second frame; means supporting said second frame on said carriage for rotation relative to said carriage about a second axis fixed relative to said carriage and parallel to said first mentioned axis; a second weight means; means restraining said second weight means to movement along a noncircular endless path fixed relative to said second frame; said second weight means being located along one portion of its said endless path and being absent from another substantial portion of said length of its endless path; third means for driving said second frame about said second axis relative to said carriage in unison with but in the opposite directon to the movement of said first mentioned frame about said first mentioned axis; and fourth means operable in synchronism with said first and third means for driving said second weight means along its said endless path relative to said second frame.

4. A device which converts centrifugal force into a unidirectional force, said device comprising: a centrifugal force generator including a frame, a weight means, and means restraining said weight means to movement along an elongated path fixed relative to said frame and having two curved end segments at which said weights change direction, said weight means being distributed substantially uniformly along a continuous portion of the length of said elongated path so that during each traverse of said path by said weight means a first centrifugal force is produced as said weight means passes over the first of said two end segments and a second centrifugal force having a direction generally opposite to that of said first centrifugal force is produced as said weight means moves over the other of said two end segments of said path; a carriage; means supporting said frame on said carriage for rotation relative to said carriage about an axis fixed relative to said carriage and located in a plane generally perpendicular to the longitudinal direction of said path; and means for relatedly driving said frame about said axis relative to said carriage and said weight means along said path relative to said frame, said driving means being such that each time said weight means moves over one or the other of said two end segments of said path such end segment is facing generally forwardly relative to said carriage so that the centrifugal force then produced has a component urging said carriage in a forward direction.

5. A device which converts centrifugal force into a unidirectional force, said device comprising: a centrifugal force generator including a frame, a weight means, and means restraining said weight means to movement along a path fixed relative to said frame and consisting of two substantially parallel segments joined by two substantially semicircular end segments, said weight means being distributed substantially uniformly along a continuous portion of the length of said path so that during each traverse of said path by said weight means a first centrifugal force is produced as said weight means passes over the first of said two semicircular segments and a second centrifugal force having a direction generally opposite to that of said first centrifugal force is produced as said weight means moves over the other of said two semicircular segments of said path; a carriage; means supporting said frame on said carriage for rotation relative to said carriage about an axis fixed relative to said carriage and located in a plane generally perpendicular to said parallel segments of said path; and means for simultaneously driving said frame about said axis relative to said carriage and said weight means along said path relative to said frame, said driving means being such that as said frame makes one complete rotation about said axis said weight means makes one complete traverse along said path so that each time said weight means moves over one or the other of said two semicircular segments of said path the centrifugal force produced has a component urging said carriage in a forward direction.

6. A device as defined in claim 5 further characterized by said weight means and said means restraining said weight means to movement along a path fixed relative to said frame and consisting of two parallel segments joined by two semicircular end segments comprising first and second rotatable members rotatable about spaced parallel axes fixed relative to said frame, a flexible endless member trained over said two rotatable members, and a plurality of weights located contiguous to one another along a portion of said endless flexible member and attached to said member for movement therewith.

7. A device as defined in claim 5 further characterized by said weight means and said means restraining said weight means to movement along a path fixed relative to said frame and consisting of two parallel segments joined by two semicircular end segments comprising a first pair of circular members rotatable about a first axis relative to said frame and spaced from one another along said axis, a second pair of circular members rotatable about and spaced from one another along a second axis fixed relative to said frame parallel to and spaced from said first axis, two flexible endless members each trained over a respective one of said first pair of circular members and a corresponding one of said second pair of circular members, a plurality of weights arranged contiguous to one another along a given portion of the length of said two flexible members, each of said weights extending transversely from one of said flexible members to the other, and means attaching each of said weights to both of said flexible members for movement therewith.

8. A device as defined in any one of claims 5, 6 and 3 further cahracterized by said portion of the length of said path along which said weight means is distributed being greater than the length of each of said semicircular end segments of said path and less than one-half the total length of said path.

9. A device as defined in claim 5 further characterized by said carriage being part of a vehicle adapted for movement in said forward direction, and a power source carried by said carriage and drivingly connected with said driving means for powering said driving means.

10. A device which converts centrifugal force into a unidirectional force, said device comprising two centrifugal force generators each including a frame, a weight means, and means restraining said weight means to movement along a path fixed relative to said frame and consisting of two substantially parallel segments joined by two substantially semicircular end segments, said weight means being distributed substantially uniformly along a continuous portion of the length of said path so that during each traverse of said path by said weight means a first centrifugal force is produced as said weight means passes over the first of said two semicircular segments and a second centrifugal force having a direction generally opposite to that of said first centrifugal force is produced as said weight means moves over the other of said two semicircular segments of said path; a carriage; means supporting said frames of said two centrifugal force generators on said carriage for rotation relative to said carriage about two respective parallel axes fixed relative to said carriage and each of which axes is located in a plane generally perpendicular to the parallel segments of the path of its associated weight means; and means for simultaneously driving said frames of said two centrifugal force generators in opposite directions about their respective axes relative to said carriage and for also simultaneously driving said weight means of said two generators along their paths relative to their associated frames, said driving means being such that both of said frames are driven in synchronism at the same speed and such that as each frame makes one complete revolution about its axis relative to said carriage its associated weight means makes one complete traverse along its path relative to its frame so that each time said weight means moves over one or the other of the two semicircular segments of its path relative to its frame the centrifugal force produced has a component urging said carriage in a forward direction, said two frames of said two centrifugal force generators being so phased that when said parallel path segments of one generator are parallel with said forward direction the parallel path segments of said other generator are also parallel to said forward direction, and said weight means of said two centrifugal force generators being so phased as to pass over the semicircular end segments of their associated paths when such end segments are generally facing said forward direction.

11. A device as defined in claim 10 further characterized by said two axes being located in a plane perpendicular to said forward direction.

12. A unidirectional force generating device comprising: two centrifugal force generators each including a frame, a weight means, and means restraining said weight means to movement along a path fixed relative to said frame and consisting of two substantially parallel segments joined by two substantially semicircular end segments, said weights being distributed substantially uniformly along a continuous portion of the length of said path so that during each traverse of said path by said weight means a first centrifugal force is produced as said weight means passes over the first of said two semicircular segments and a second centrifugal force having a direction generally opposite to that of said first centrifugal force is produced as said weight means moves over the other of said two semicircular segments of said path; a carriage having a forward direction; means supporting each of said frames of said two centrifugal force generators on said carriage for rotation relative to said carriage about an axis fixed relative to said carriage and located in a plane generally perpendicular to the parallel segments of the path of the associated weight means; and means for simultaneously driving both of said frames of said two centrifugal force generators about their axes relative to said carriage and also for simultaneously driving both of said weight means along their paths relative to said frames, said paths of said weight means of said two centrifugal force generators being arranged so that when said parallel segments of one path are aligned with said forward direction said parallel segments of the other of said paths are at an angle to said forward direction, said drive means being such that as each of said frames makes one complete revolution about its axis relative to said carriage the associated weight means makes one complete traverse along its path, said two weight means of said two generators being so phased that as to pass over the semicircular end segments of their associated paths when such end segments are generally facing said forward direction.

13. A device as defined in claim 12 further characterized by said two frames being fixed relative to one another for rotation relative to said carriage about a common axis fixed to said carriage.

14. A unidirectional force generating device comprising: four centrifugal force generators including two frames each common to two of said generators, each of said generators further including a weight means, and means restraining said weight means to movement along a path fixed relative to its frame and consisting of two substantially parallel segments joined by two substantially semicircular end segments, said weights being distributed substantially uniformly along a continuous portion of the length of said path so that during each traverse of said path by said weight means a first centrifugal force is produced as said weight means passes over the first of said two semicircular segments and a second centrifugal force having a direction generally opposite to that of said first centrifugal force is produced as said weight means moves over the other of said two semicircular segments of said path; a carriage having a forward direction; means supporting each of said frames on said carriage for rotation relative to said carriage about an axis fixed relative to said carriage and located in a plane generally perpendicular to the parallel segments of the two paths of the two weight means associated with the frame, said parallel segments of the two paths of the two weight means associated with each frame being arranged at an angle to one another about the axis of the frame, and such angle being the same for both of said frames; and means for simultaneously driving both of said frames about their axes in opposite directions and at the same speed relative to said carriage and for also simultaneously driving all four of said weight means along their paths relative to their respective frames, said driving means being such that as said frames make one complete rotation about their axes each of said weight means makes one complete traverse along its associated path, and said four weight means being so phased relative to one another that as each weight means passes over either one of the semicircular end segments of its associated path such end segment is generally facing said forward direction.

15. A device as defined in claim 11 further characterized by said two axes being located in a plane perpendicular to said forward direction.

16. A device which converts centrifugal force into a unidirectional force, said device comprising four centrifugal force generators each including a frame, a weight means, and means restraining said weight means to movement along a path fixed relative to said frame and consisting of two substantially parallel segments joined by two substantially semicircular end segments, said weight means being distributed substantially uniformly along a continuous portion of the length of said path so that during each traverse of said path by said weight means a first centrifugal force is produced as said weight means passes over the first of said two semicircular segments and a second centrifugal force having a direction generally opposite to that of said first centrifugal force is produced as said weight means moves over the other of said two semicircular segments of said path; a carriage having a forward direction; means supporting the frames of a first two of said centrifugal force generators on said carriage for rotation relative to said carriage about two respective parallel axes located in a plane perpendicular to said forward direction and each of which axes is also located in a plane generally perpendicular to the parallel segments of the path of its associated weight means; means supporting the frames of a second two of said centrifugal force generators on said carriage for rotation relative to said carriage about two respective parallel axes located in a plane perpendicular to said forward direction and each of which axes is also located in a plane generally perpendicular to the parallel segments of the path of its associated weight means; and means for simultaneously driving said frames of said first two centrifugal force generators in opposite directions about their respective axes relative to said carriage, for driving said frames of said second two centrifugal force generators in opposite directions about their respective axes relative to said carriage, and for also simultaneously driving said weight means of all four of said generators along their paths relative to their associated frames, said driving means being such that all four of said frames are driven in synchronism at the same speed and such that as each frame makes one complete revolution about its axis relative to said carriage its associated weight means makes on complete traverse along its path relative to its frame so that each time said weight means moves over one or the other of the two semicircular segments of its path relative to its frame the centrifugal force produced has a component urging said carriage in a forward direction, said two frames of said first two centrifugal force generators being so phased that when said parallel path segments of one generator are parallel with said forward direction the parallel path segments of the other generator are also parallel to said forward direction, said two frames of said second two centrifugal force generators being so phased that when said parallel path segments of one generator are parallel with said forward direction the parallel path segments of the other generator are also parallel to said forward direction, said two frames of said first two generators and said two frames of said second two generators being so phased that when said parallel path segments of said first two generators are parallel with said forward direction the parallel path segments of said second two generators are out of parallel with said forward direction, and said weight means of all four of said generators being so phased as to pass over the semicircular end segments of their associated paths when such end segments are generally facing said forward direction.

17. A device as defined in claim 16 further characterized by one of the frames of said first two generators and one of the frames of said second two generators being fixed to one another for rotation about a common axis relative to said carriage and the frames of the remaining two of said four generators being fixed to one another for rotation about another common axis relative to said carriage.

18. A device as defined in claim 16 further characterized by said carriage being part of a vehicle adapted for movement in said forward direction, and a power source carried by said carriage and drivingly connected with said driving means for powering said driving means.

* * * * *

UNITED STATES PATENT AND TRADEMARK OFFICE
CERTIFICATE OF CORRECTION

PATENT NO. : 4,261,212
DATED : April 14, 1981
INVENTOR(S) : Harry S. Melnick

It is certified that error appears in the above-identified patent and that said Letters Patent are hereby corrected as shown below:

Column 8, line 8, delete "3" and substitute --7--.

Signed and Sealed this

Twenty-third Day of June 1981

[SEAL]

Attest:

RENE D. TEGTMEYER

Attesting Officer

Acting Commissioner of Patents and Trademarks